US007006515B1

(12) United States Patent
Yeung

(10) Patent No.: US 7,006,515 B1
(45) Date of Patent: Feb. 28, 2006

(54) ISOCHRONOUS QUEUE AND BUFFER MANAGEMENT

(75) Inventor: Pauline Sai-Fun Yeung, San Jose, CA (US)

(73) Assignee: Omneon Video Networks, Sunnyvale, CA (US)

( * ) Notice: Subject to any disclaimer, the term of this patent is extended or adjusted under 35 U.S.C. 154(b) by 0 days.

(21) Appl. No.: 09/544,865

(22) Filed: Apr. 7, 2000

(51) Int. Cl.
 H04L 12/28 (2006.01)
(52) U.S. Cl. ...................... 370/423; 370/413; 370/429
(58) Field of Classification Search .................. 710/39, 710/54, 52, 316, 317, 310; 711/167, 157, 711/154; 370/411, 412, 413, 414, 423, 428, 370/429, 468, 394
 See application file for complete search history.

(56) References Cited

U.S. PATENT DOCUMENTS

| | | | | | |
|---|---|---|---|---|---|
| 4,495,615 | A | * | 1/1985 | Wilcke | 370/58 |
| 4,682,284 | A | * | 7/1987 | Schrofer | 710/55 |
| 5,285,445 | A | * | 2/1994 | Lehnert et al. | 370/60 |
| 5,379,278 | A | * | 1/1995 | Safadi | 370/16 |
| 5,455,820 | A | * | 10/1995 | Yamada | 370/17 |
| 5,521,928 | A | * | 5/1996 | Worsley et al. | 370/362 |
| 5,668,948 | A | * | 9/1997 | Belknap et al. | 709/231 |
| 5,742,623 | A | * | 4/1998 | Nuber et al. | 714/798 |
| 5,758,075 | A | * | 5/1998 | Graziano et al. | 709/250 |
| 5,809,550 | A | * | 9/1998 | Shukla et al. | 711/167 |
| 5,845,152 | A | * | 12/1998 | Anderson et al. | 710/52 |
| 5,991,520 | A | * | 11/1999 | Smyers et al. | 710/100 |
| 6,094,430 | A | * | 7/2000 | Hoogenboom | 370/375 |
| 6,137,807 | A | * | 10/2000 | Rusu et al. | 370/429 |
| 6,201,807 | B1 | * | 3/2001 | Prasanna | 370/389 |
| 6,209,067 | B1 | * | 3/2001 | Collins et al. | 711/158 |
| 6,289,427 | B1 | * | 9/2001 | Tanaka | 711/201 |
| 6,347,097 | B1 | * | 2/2002 | Deng | 370/498 |
| 6,510,161 | B1 | * | 1/2003 | Trevitt et al. | 370/412 |
| 6,587,910 | B1 | * | 7/2003 | Smyers et al. | 710/306 |

OTHER PUBLICATIONS

Hansen, Brad; The Dictionary of Multimedia, 1998, p 123.*
Hoffman, et al., Compcon '95, IEEE 1394: *A Ubiquitous Bus*, pp. 1-9, (visited Jan. 20, 2000) Mar. 5 to 9. 1995 <http://www.skipstone.com/compcon.html>.
Jennings, R., IEEE 1934 High Performance Serial Bus, *Fire on Wire*, pp. 1-18, (last modified Apr. 8, 1999) <http://www.chumpchange.com/parkplace/video/dvpapers/firewire.html>.

* cited by examiner

Primary Examiner—Ajit Patel
Assistant Examiner—Steve Blount
(74) Attorney, Agent, or Firm—Blakely, Sokoloff, Taylor & Zafman LLP

(57) ABSTRACT

A method of processing packets in a switch. A first queue is selected from at least three queues based on the cycle number (C) of a cycle and flushed at the start of cycle C. At least one isochronous packet is received over a bus during the cycle. The packet is placed in a second queue based on the cycle number.

18 Claims, 6 Drawing Sheets

ISOCHRONOUS QUEUE AND BUFFER MANAGEMENT

FIELD OF THE INVENTION

The present invention relates generally to switches. More specifically, the present invention relates to isochronous queue and buffer management in switches.

BACKGROUND OF THE INVENTION

The IEEE Standard for a High Performance Serial Bus, IEEE Std. 1394-1995 published Aug. 30, 1996 (1394-1995 Standard) and its progeny provide a high speed serial protocol which permits implementation of high speed data transfers. The existing progeny includes P1394a Draft Standard for a High Performance Serial Bus (1394a Standard) and P1394b Draft Standard for a High Performance Serial Bus (1394b Standard). Generically, systems implementing 1394-1995, 1394a, 1394b or subsequent revisions and modifications thereof are referred to herein as 1394 systems.

The IEEE 1394 standard is an international standard for implementing a high-speed serial bus architecture, which supports both asynchronous and isochronous format data transfers. The IEEE 1394 standard defines a bus as a non-cyclic interconnect. Within a non-cyclic interconnect, devices may not be connected together so as to create loops.

In networks, switches filter and forward packets between local area network segments. In packet switching, packets are individually routed between nodes with no previously established communication path. An algorithm is used to route packets to their destination through the most expedient route. The destination computer reassembles the packets in their appropriate order. Packet switching optimizes the use of bandwidth available in a network and minimizes the latency (the time it takes for a packet to cross a network connection, from sender to receiver).

In a 1394 network with multiple 1394 buses and 1394 switches, all the 1394 buses should be synchronous. But due to cycle skewing, the cycle start packets are not all generated at the same time in different 1394 buses. Cycle skewing occurs when a large asynchronous packet is sent over a bus and the large packet is late, which may delay the start of the next cycle.

In a switch, there may be packets arriving from different ingress ports routed to one egress port. Because of cycle skewing, a packet from one cycle may arrive in the egress port after a packet from a subsequent cycle.

Packets being switched may also be transmitted out of order from the switch because a first packet arriving before a second packet at a switch may not be completely received before the second packet is completely received. Thus, the second packet would be sent out before the first packet because the second packet was completely received before the first packet.

SUMMARY OF THE INVENTION

A method of processing packets in a switch is described. A first queue is selected from at least three queues based on the cycle number (C) of a cycle and flushed at the start of cycle C. At least one isochronous packet is received over a bus during the cycle. The packet is placed in a second queue based on the cycle number.

BRIEF DESCRIPTION OF THE DRAWINGS

Features and advantages of the prevention invention will be apparent to one skilled in the art in light of the following detailed description in which.

DETAILED DESCRIPTION

A method and system for a method and system for isochronous queue and buffer management are described.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
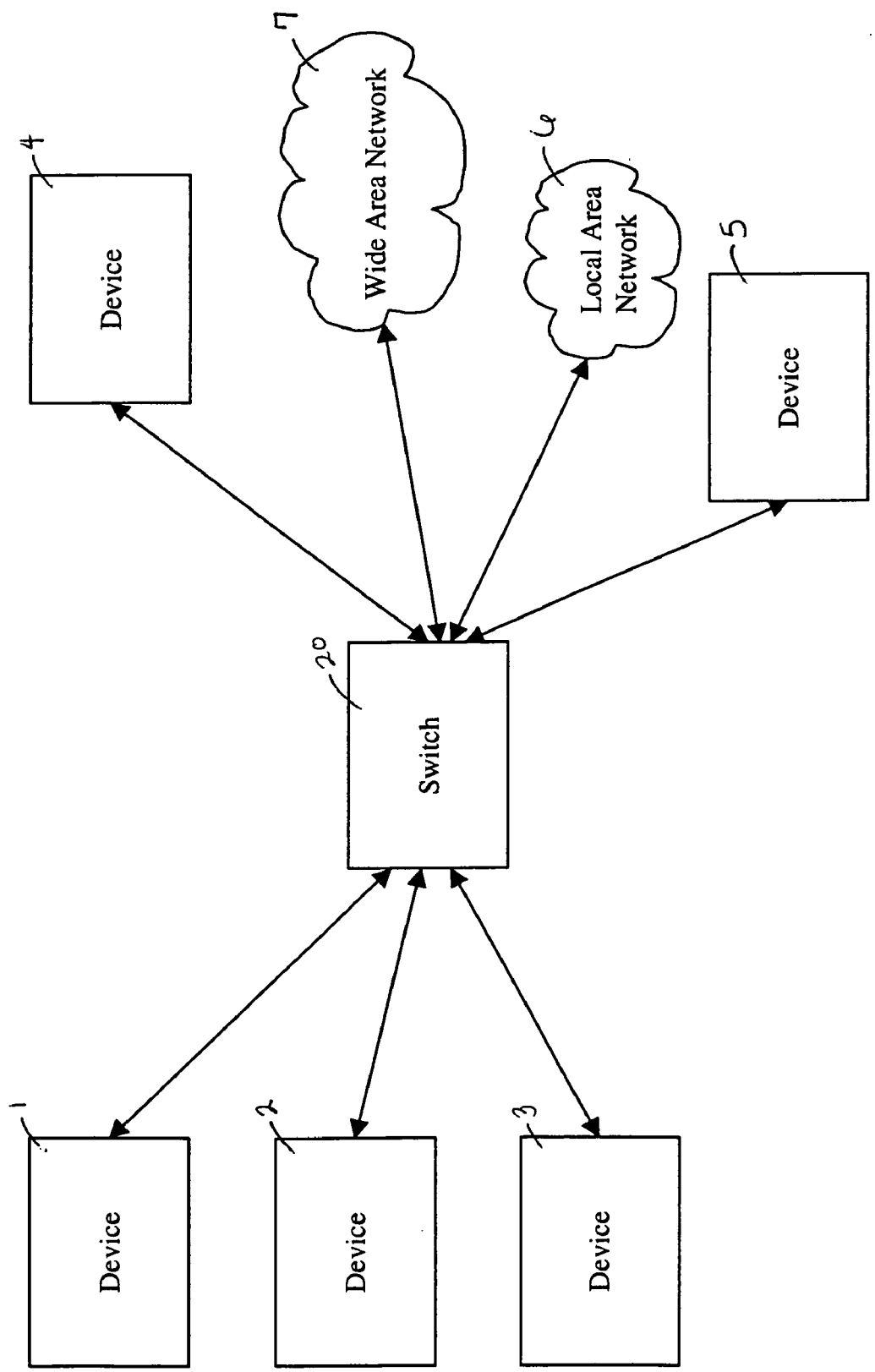
FIG. 1 is a block diagram of one embodiment of a switch in a communications network.

FIG. 1 is a block diagram of one embodiment of the switch in a communications network. Switch 20 is connected to devices 1–5, a wide area network 7 and a local area network 6. Devices 1–5 may include audio, video and/or audio/video devices including storage systems and telecommunications. The wide area network may include the internet or proprietary network or a television communications network.

Figure 2:
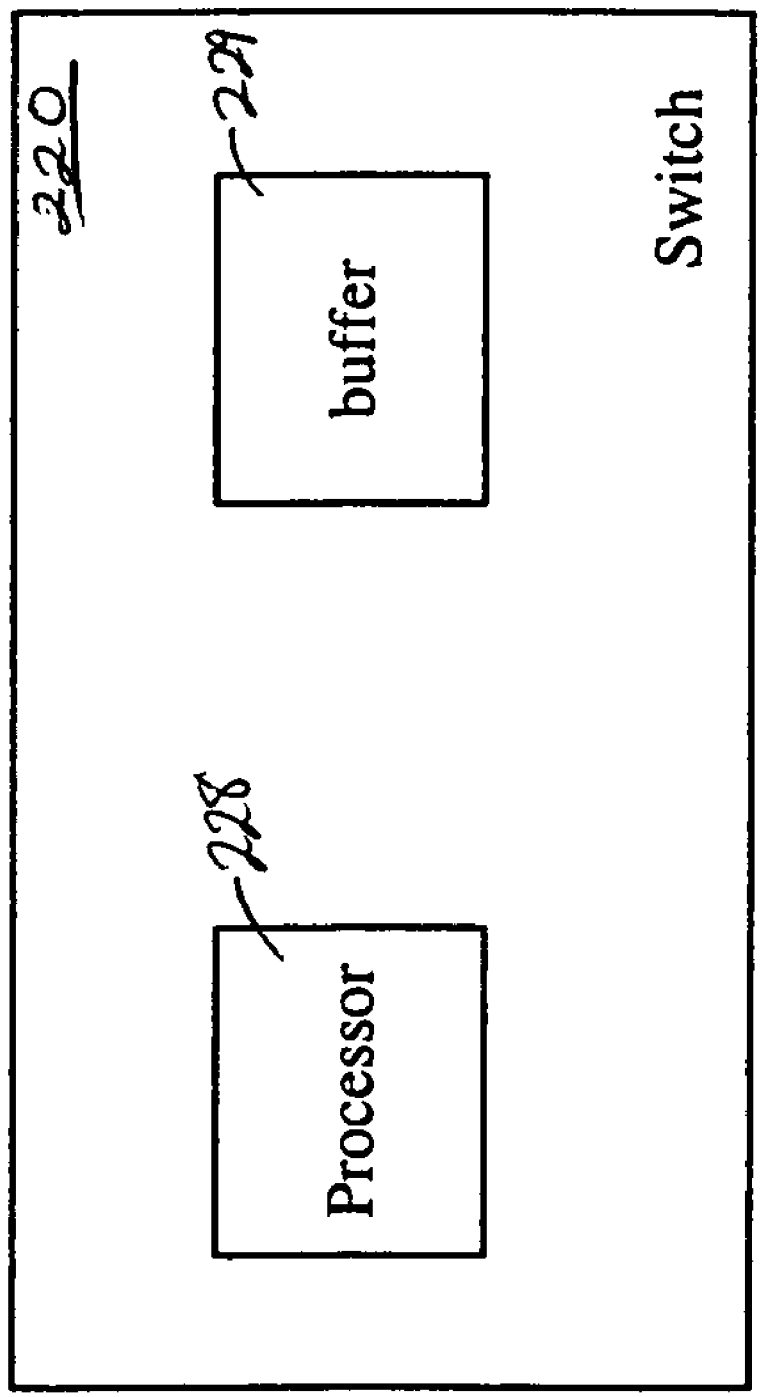
FIG. 2 is a block diagram of one embodiment of a switch.

FIG. 2 is a block diagram of one embodiment of a switch. FIG. 2 shows a switch 220 including a processor 228 and a buffer 229. The processor 228 directs operations within the switch 220 and the buffer 229 stores switched packet streams to be transmitted, as described below. Switch 220, according to one embodiment, is configured to switch packets on a IEEE 1394 Standard Serial Bus.

Figure 3:
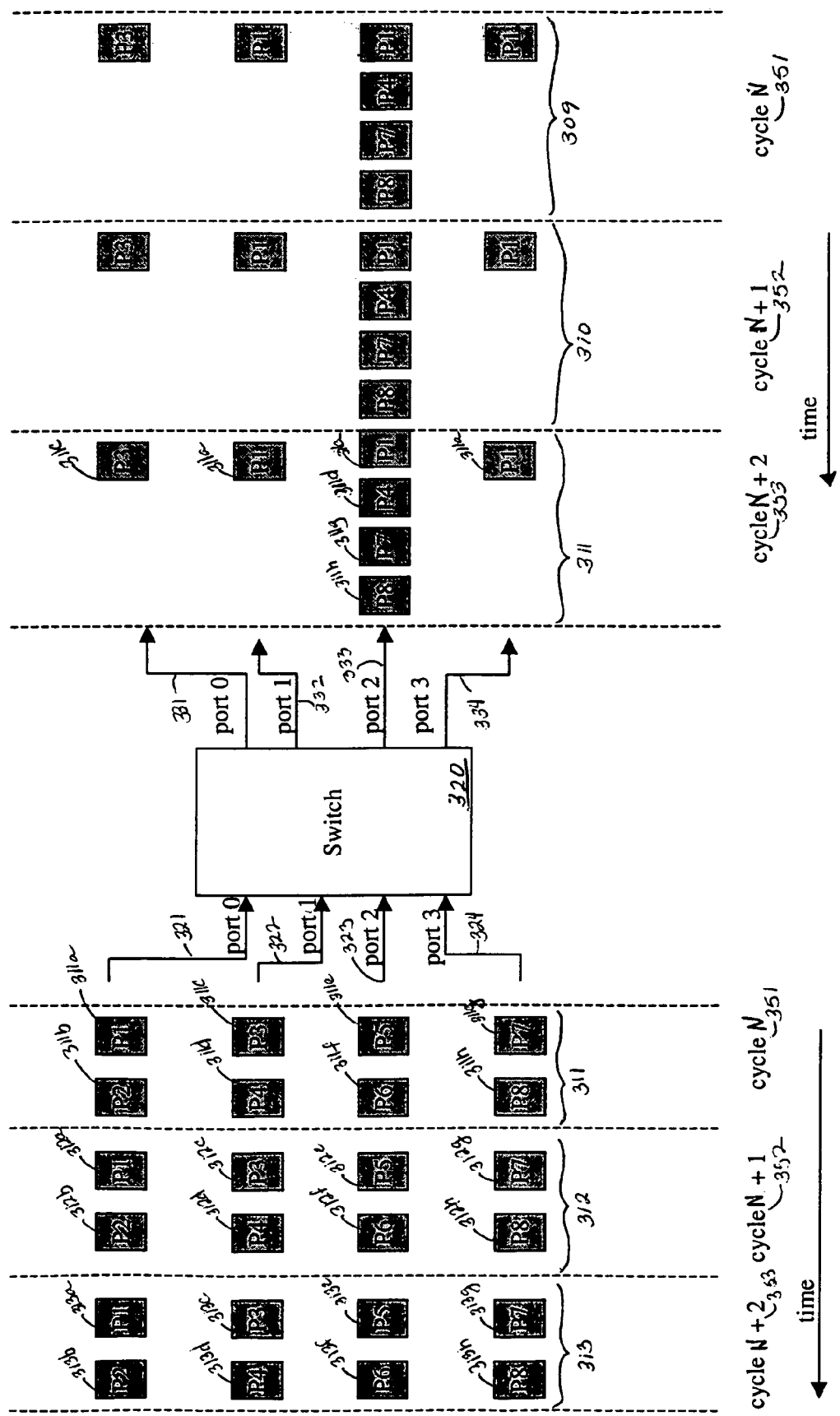
FIG. 3 is a block diagram of packet processing in one embodiment of a switch.

FIG. 3 is a block diagram of packet processing in one embodiment of a switch. FIG. 3 illustrates a switch 320 having ingress ports 321–324 and egress ports 331–334. The number of ingress ports and egress ports in the switch may vary depending on the application and how many devices or buses are served by the switch.

Each ingress port 321–324 receives a stream of packets. Ingress port 321 receives a stream of packets including packets 311*a*–*b*, 312*a*–*b*, and 313*a*–*b*. Ingress port 322 receives a stream of packets including packets 311*c*–*d*, 312*c*–*d*, and 313*c*–*d*. Ingress port 323 receives a stream of packets including packets 311*e*–*f*, 312*e*–*f*, and 313*e*–*f*. Ingress port 324 receives a stream of packets including packets 311*g*–*h*, 312*g*–*h*, and 313*g*–*h*. Each ingress port 321–324 may be associated with an IEEE Standard 1394 Bus (not shown) or other connections or channels including ethernet, asynchronous transfer mode (atm), T-1 or T-3 carrier, OC-X or any other suitable connection. Packets in packet streams 311–313 may be isochronous packets, according to one embodiment, or any other type of packet that is suitable.

FIG. 3 shows packet streams 311–313 arriving at ingress ports 321–324 as follows: packets 311*a*–*h* arrive at ingress ports 321–324 during cycle (N) 351, packets 312a–h arrive at ingress ports 321–324 during cycle (N+1) 352, and packets 312a–h arrive at ingress ports 321–324 during cycle (N+2) 353.

FIG. 3 shows packet stream 311 leaving switch 320 through egress ports 331–334 at cycle (N+2) 353. Packets 311 arriving at switch 320 at cycle N may be switched during cycles (N), (N+1) and, possibly (N+2). The packets 311 are sent out during cycle (N+2), two cycles after they arrive. As shown in egress cycles 351 and 352, packets 309, which arrived during cycle (N−2) (not shown) are sent out at cycle (N) 351 and packets 310, which arrived during cycle (N−1) (not shown) are sent out at cycle (N+1) 352.

The minimum delay of a 1394 isochronous packet in a 1394 switch is two 1394 cycles. Thus, the 1394 switch 320 uses a buffer management system, as discussed below, to assure that packets arriving at a cycle (N) 351 are sent out in a cycle (N+2) 353.

Figure 4:
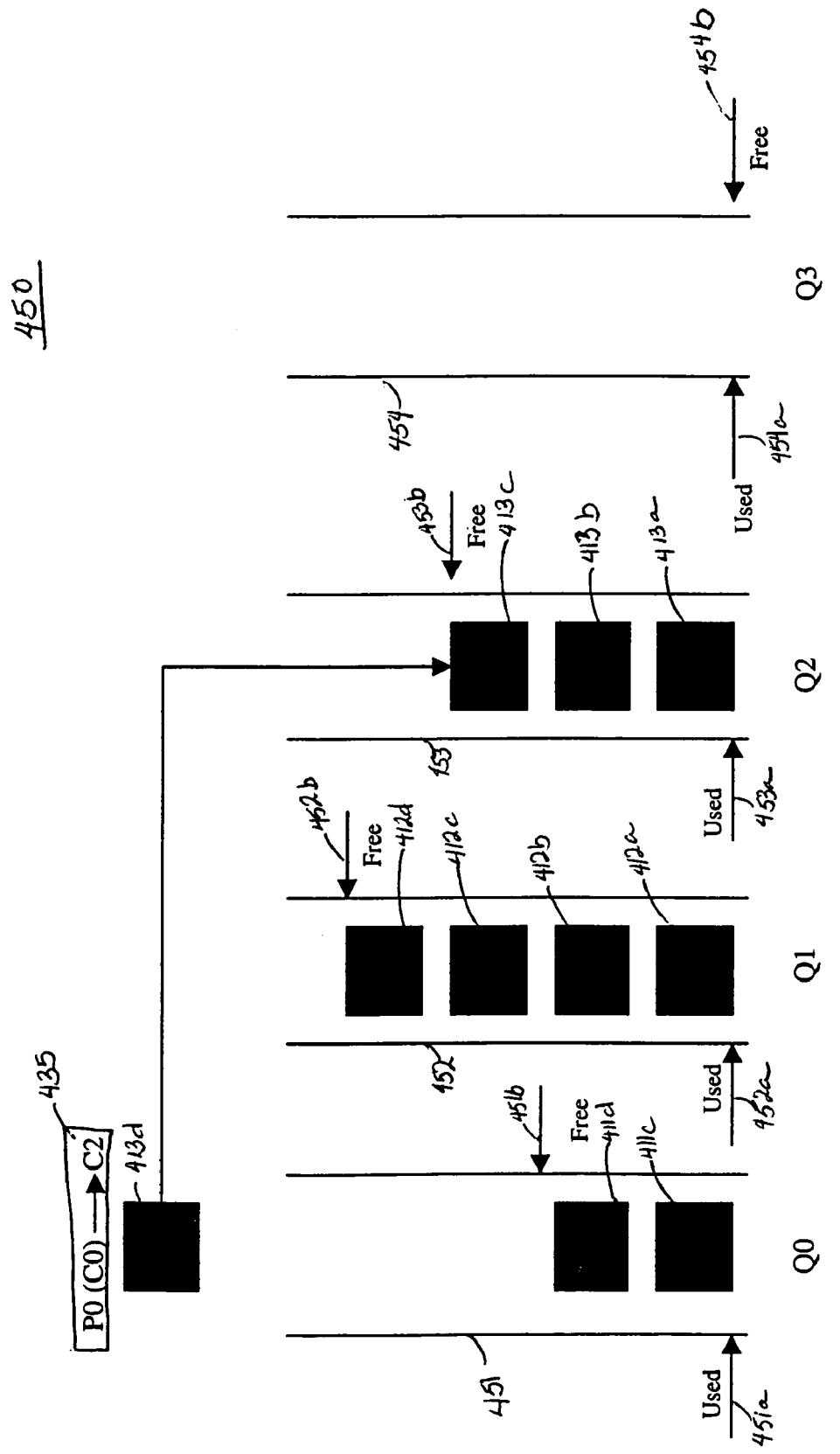
FIG. 4 is a block diagram of buffer management in one embodiment of a switch.

FIG. 4 is a block diagram of a buffer management system in one embodiment of a switch. In the embodiment shown, buffer management system 450 includes four queues Q0–Q3 451–454 each having a Used pointer 451–454a and a Free pointer 451–454b. Although the buffer management system 450 shown in FIG. 4 includes four queues, three queues may be used instead. Each egress port 331–334 has a buffer management system 450 including four queues Q0–Q3 451–454.

In the embodiment shown, packet streams 411, 412, and 413 have arrived at a switch 320. Packet streams 411–413 include packets 411a–411d, 412a–412d and 413a–413d, respectively. The queue numbers correspond to the cycle of the switch 320 in which the packet streams 411–413 will be sent out. As shown by block 435, a packet stream P0(C0) 413, where (C0) represents a time stamp of cycle C0, arrives at cycle C0 and will be sent out at cycle C2.

As egress packet queues 451–454 are filled up, the free pointer values 451–454b are set at free =n, where n represents the point at which packets may be added to queues 451–454. Thus, as shown with reference to Q2 453, free pointer 453b points to the free space after packet 413c, where packet 413d is to be received.

Also, as the packet queues 451–454 are filled up, the used pointer value is set to represent the next packet to be transmitted, as shown by pointers 451–454a. As shown with reference to Q2 453, used pointer 453a is set to 0 and points to space from which the next packet is to be transmitted from the queue Q2 453, through an egress port 331–334 of switch 320. With reference to Q0 451, which is in the process of transmitting packets, the used pointer value 451a equals m, where m represents the space from which the next packet will be sent.

When an packet queue 451–454 is flushed or cleared, a used pointer value 451–454b is set to 0 to show that the space from which the next packet is to be transmitted. As shown with reference to Q3 454, used pointer 454b points to the space from which the next packet is to be transmitted from queue Q3 454, through an egress port 331–334 of switch 320. Also, when an packet queue 451–454 is flushed or cleared, a free pointer value is set to 0 to show that the queue is empty. As shown with reference to Q3 454, to show that the queue 454 is free, 454a is set to 0 to point to the place in queue Q3 454 where the next packet may be placed.

At any given cycle C of the switch 320, there are isochronous packets in the switch 320 which arrived in cycle C, C-1 557, and C-2 556. To guarantee the packets are sent in the proper cycle, at least three packet queues are needed for every egress port.

Figure 5:
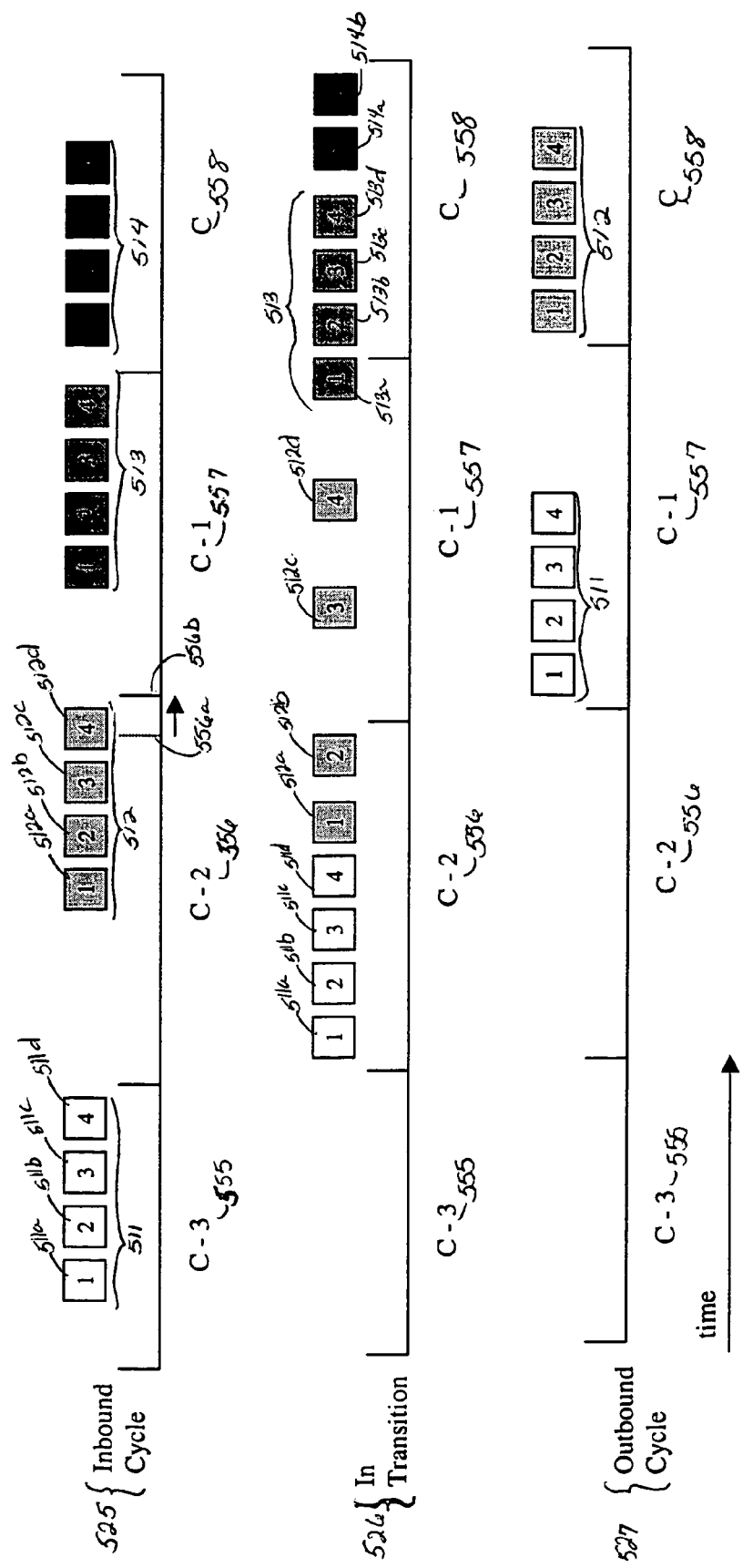
FIG. 5 is a block diagram of delay adjustment in one embodiment of a switch.

FIG. 5 is a block diagram of delay adjustment in one embodiment of a switch. A delay adjustment may become necessary where cycle skewing, as described above, occurs. A switch 320 includes an inbound cycle 525, a transition cycle 526 and an outbound cycle 527. Packet streams 511a–d, 512a–d, 513a–d, and 514a–d are received at switch 320 during cycles C-3 555, C-2 556, C-1 557, and C 558 of the inbound cycle of the switch.

In the embodiment shown, input packets 511 comes in at inbound cycle C-3 555 and input packets 512 starts to come in at inbound cycle C-2 556 of inbound cycle 525. However input packet stream 512 includes packet 512d which comes in at the end of cycle C-2 556 and almost in cycle C-1 557. Thus, cycle C-2 556 is expanded from 556a to accommodate the late packet and cycle C-1 557 is shortened.

In transition cycle 526, packets 512a and 512b of input packets 512 are switched during cycle C-2 556 and placed in the appropriate egress packet queue 451–454, while packets 512c and 512d are switched at cycle C-1 557 and placed in the appropriate packet queue 451–454. Because packets 512 arrived during inbound cycle C-2 556, it will be buffered to go out at cycle C even though a few of the packets were late. Thus, input packets 512 is sent out at cycle C 558 of outbound cycle 527.

Packets 511, received at cycle C-3 555 is switched during cycle C-2 556 of the transition cycle, and sent out at cycle C-1 557. However, packets 511 need not be switched at cycle C-2 556. Packets 513, which is received during cycle C-1 557 is switched during cycles C-1 557 and C 558, and will be sent out during cycle C+1, not shown. Packet 513a is switched during cycle C-1 557 and packets 513b–d are switched during cycle C 558. Also, as shown, packets 514a–b are switched at cycle C 558, the cycle during which packets 514 was input.

Figure 6:
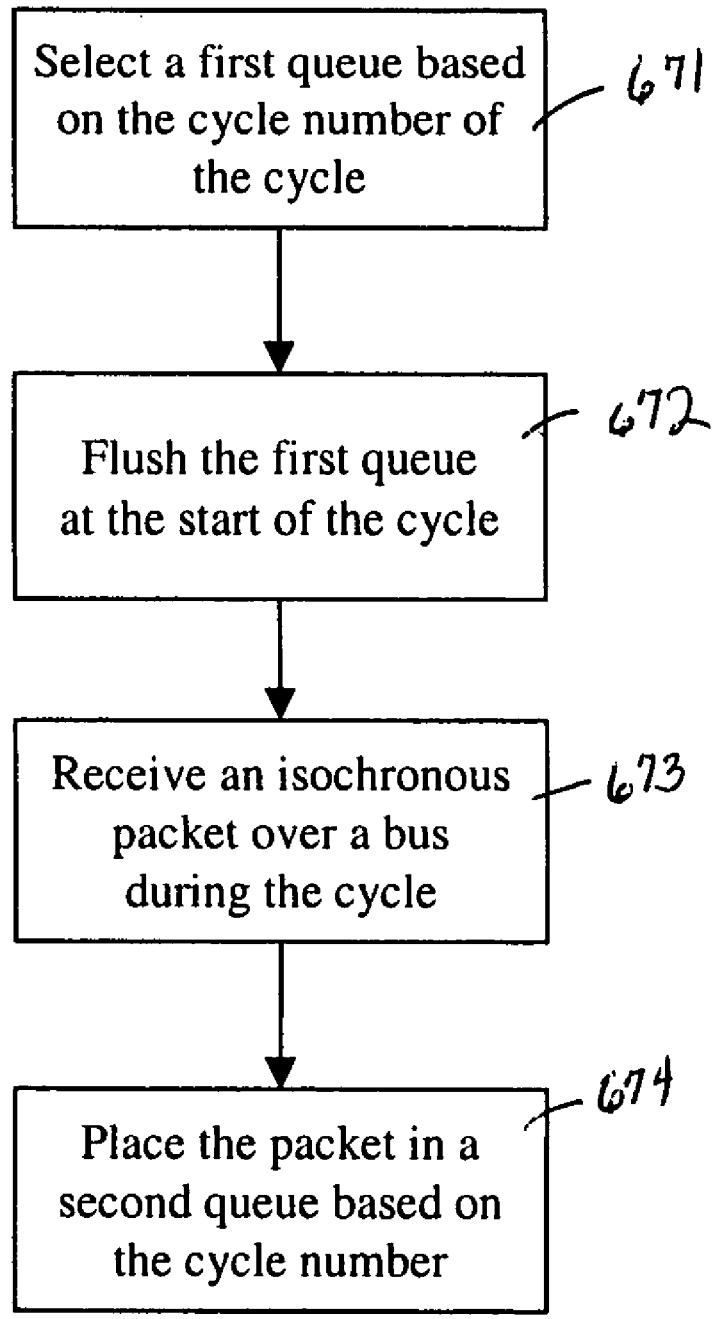
FIG. 6 is a flow diagram for packet processing in one embodiment of a switch.

FIG. 6 is a flow diagram for packet processing in one embodiment of a switch. At processing block 671, a first queue is selected based on the cycle number of the egress cycle of the switch 220. At processing block 672, the first queue is flushed at the start of the cycle. At processing block 673, an isochronous packet is received over a bus. At processing block 674, the packet is placed in a packet queue based on the cycle number of the cycle. The multiple packet queues Q0–Q3 451–454 are used in each egress port of the 1394 switch to resolve the order of packets that will depart in different cycles according to the egress 1394 cycle time.

Thus, if n queues are used for each port, where n≧3, packets that arrived in cycle C would go to queue number (C+2) % n (where % stands for remainder). In cycle C, the egress port sends packets from queue (C % n). Thus, if cycle number C is 5 and the number of queues equals 4, the egress port will send packets from queue number Q1, since the remainder of (5/4) is one.

When a packet stream 411 arrives at the egress port, as represented in processing block 673, a packet buffer 451–454 is allocated from the packet buffer pool to hold the complete packet. When this packet departs, there is no need to free the memory associated with this packet buffer. Rather at the beginning of each cycle C, all memory in the packet buffer pool associated with packet queue number (C−1) % n is reclaimed. Thus if the cycle number is 5 and the number of queues equals 4, Q0 451 would be flushed at the beginning of cycle five while Q1 is being filled up. Thus, the queue being filled, the queue being flushed and the queue having packets transmitted are all based on the cycle number of the 1394 switch.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

I claim:

1. A method of processing packets in a switch comprising:
   selecting a first queue from at least three queues in a switch based on the cycle number (C) of a cycle;
   flushing the first queue at the start of the cycle;
   receiving at least one isochronous packet over a bus during the cycle;
   placing the packet in a second queue based on the cycle number.

2. The method of claim 1 further comprising:
   transmitting the packet from the second queue after two cycles.

3. The method of claim 1 wherein the first queue is chosen from four queues.

4. The method of claim 1 wherein the first queue is associated with a cycle that has a cycle number of C minus 1.

5. The method of claim 1 wherein the first queue number is the same as the second queue number.

6. The method of claim 1 wherein the first queue number is equal to the remainder of $(C-1)/n$ wherein n is the number of queues in the switch.

7. The method of claim 1 wherein the second queue number is equal to the remainder of $(C+2)/n$ wherein n is the number of queues in the switch.

8. The method of claim 1 further comprising:
   transmitting packets in cycle C from a third queue wherein the queue number of the third queue is equal to the remainder of $C/n$ wherein n is the number of queues in the switch.

9. The method of claim 1 further comprising:
   setting a free pointer in the first queue to 0 at the end of the cycle; and
   setting a used pointer in the first queue to 0.

10. The method of claim 1 further comprising:
    setting a used pointer in the second queue to 0 at the end of the cycle; and
    setting a free pointer in the second queue to n.

11. A switch in a network comprising:
    a buffer memory including at least three egress queues; and
    a processor to direct incoming isochronous packets into one of the egress queues based on a cycle number of the switch and to flush another of the egress queues based on the cycle number wherein the processor is configured to direct the incoming isochronous packets into the egress queue number equal to the remainder of $(C+2)/n$ wherein n is the number of queues in the switch.

12. The switch of claim 11 wherein the switch is configured to be used with at least one bus.

13. The switch of claim 11 wherein the switch is configured to be used with a connection selected from the group: ethernet bus, asynchronous transfer mode bus, IEEE 1394 standard bus, T-1, T-3, and OC-X.

14. The switch of claim 11 further comprising:
    at least one ingress port; and
    at least one egress port
    wherein each egress port is associated with at least three egress queues.

15. The switch of claim 14 wherein the egress queues store data to be transmitted by the processor from each egress port.

16. The switch of claim 11 wherein the buffer memory includes four queues.

17. A switch in a network comprising:
    a buffer memory including at least three egress queues; and
    a processor to direct incoming isochronous packets into one of the egress queues based on a cycle number of the switch and to flush another of the egress queues based on the cycle number wherein the processor is configured to flush the egress queue number equal to the remainder of $(C-1)/n$ wherein n is the number of queues in the switch.

18. A switch in a network comprising:
    a buffer memory including at least three egress queues; and
    a processor to direct incoming isochronous packets into one of the egress queues based on a cycle number of the switch and to flush another of the egress queues based on the cycle number wherein the processor is configured to transmit the isochronous packets from the egress queue number equal to the remainder of $C/n$ wherein n is the number of queues in the switch.

* * * * *